J. E. HENRY.
VULCANIZER.
APPLICATION FILED OCT. 25, 1921.
1,411,095.
Patented Mar. 28, 1922.
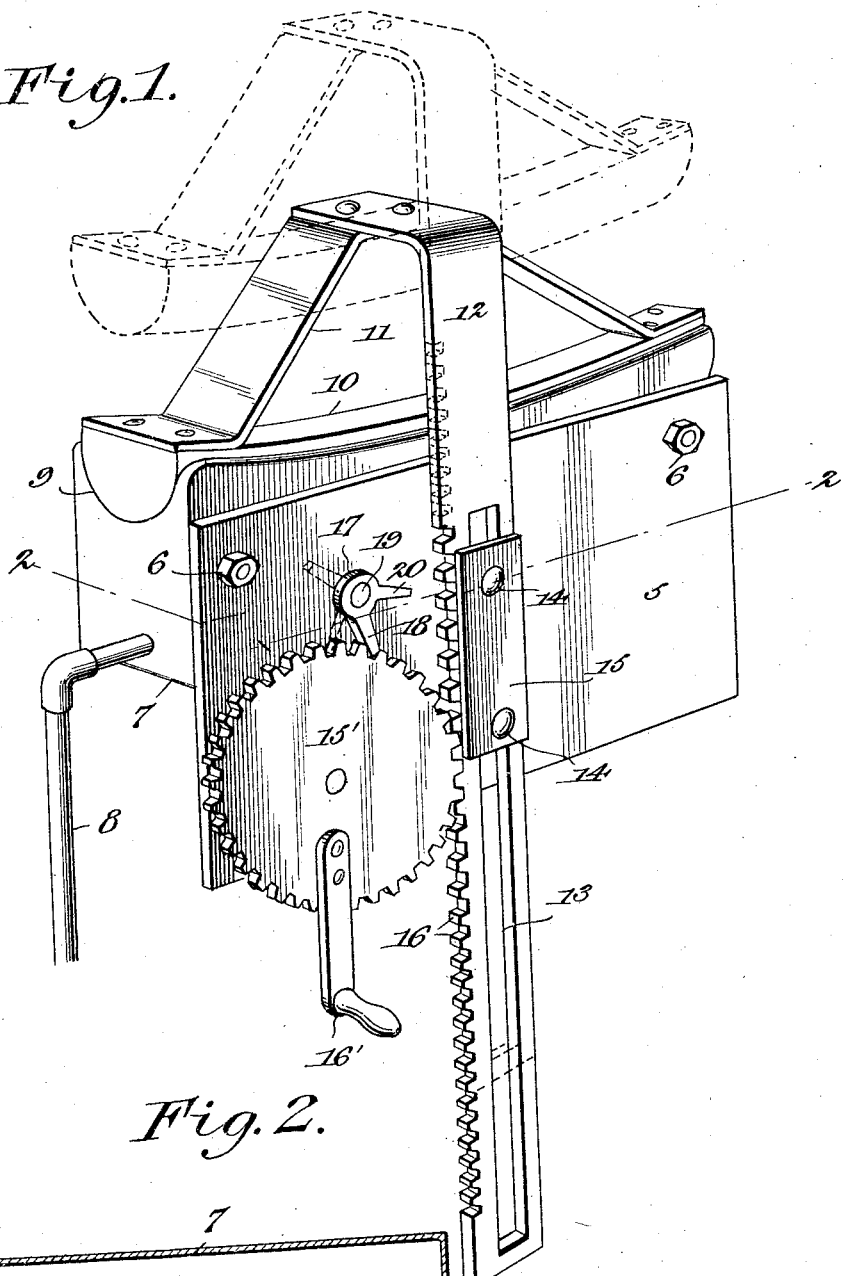
Fig. 1.
Fig. 2.
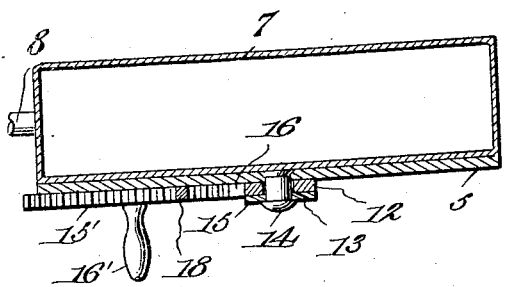
James E. Henry, INVENTOR
BY Victor J. Evans, ATTORNEY
WITNESS:

UNITED STATES PATENT OFFICE.

JAMES EDWARD HENRY, OF NEW YORK, N. Y.

VULCANIZER.

1,411,095.  Specification of Letters Patent.  Patented Mar. 28, 1922.

Application filed October 25, 1921. Serial No. 510,244.

*To all whom it may concern:*

Be it known that I, JAMES E. HENRY, a citizen of the United States, residing at New York city, in the county of New York and State of New York, have invented new and useful Improvements in Vulcanizers, of which the following is a specification.

This invention relates to vulcanizing apparatus for use in connection with pneumatic tires and the like and has for its primary object the provision of a device of this character which will facilitate the application of the tire to the oven and the removal of the same therefrom and also for convenient turning of the tire upon the vulcanizing surface of the oven.

Another object of the invention is to provide a vulcanizer which will consist of a vulcanizing oven having a heating surface and a tire plant, movable with respect to the heating surface and provided with means for effecting its retention in its different positions of adjustment.

Another object of the invention is to provide a vulcanizing apparatus which is principally in the form of an attachment capable of connection with a vulcanizing oven or mold of any suitable well known form.

With the above and other objects in view which will appear as the nature of the invention is better understood, the same consists in the improved construction and novel arrangements of parts which will hereinafter be fully described and particularly pointed out in the claims.

In the accompanying drawing, has been illustrated, a single and preferred form of the invention, it being, however, understood that no limitations are necessarily made to the precise structural details therein exhibited, but that changes, alterations and modifications within the scope of the claims may be resorted when desired.

Figure 1 is a perspective view of the vulcanizer showing the clamp lowered in full lines and raised in dotted lines.

Figure 2, is a horizontal section on the line 2—2 of Figure 1.

In carrying the invention into practice, use is made of an attaching plate 5 adapted to be secured by means 6, to one side of a vulcanizing oven or mold 7 and as illustrated, the mold is of the customary variety adapted to be heated by steam which is introduced to the chamber of the mold by way of a steam supply connection 8. The mold is provided with an arcuate channel 9 whose cross sectional form corresponds substantially with the cross sectional shape of an ordinary pneumatic casing.

Arranged to operate in the channel 9 is an arcuate clamp or pressing shoe 10, the cross sectional form of which corresponds with the configuration of the said channel so that the parts operatively adapt themselves to the tire to be vulcanized. This clamp is provided with a bracket 11 which carries a vertical rack bar 12 slotted at 13 to accommodate guide studs 14 which are secured to the plate 6. These guide studs are also associated with a clamping plate 15 so that the rack bar is free to slide between it and the aforesaid attaching plate 6.

Located at one side of the rack bar is an operating gear 15' whose teeth intermesh with the teeth 16 of said rack bar so that when the gear is turned, the bar can be respectively moved in two directions, causing the pressing shoe or clamp 10 to be moved with relation to the walls of the mold channel 9. This gear is provided with a crank handle 16 whereby it can be conveniently operated by hand. In order that the pressing shoe or clamp 10 can be retained in its different positions of adjustment, use is made of a locking dog 17 having a nose 18 which engages with the teeth of the gear 15 as shown in full lines in Figure 1. When this nose is accordingly engaged with the gear, the latter is positively locked against retrograde motion and the shoe or clamp 10 is held in firm pressing confinement with the casing of the tire during the cooking or vulcanizing process. When this dog is turned on its pivot 19, so that its nose 20 is brought into engagement with the teeth of the gearing, the clamping shoe 10 is held in an elevated position as shown in dotted lines in Figure 1.

From the construction set forth, it will be observed that by simply manipulating the dog 17, the gear 15 can be turned in the required direction to effect adjustments of the pressing or clamping shoe 10. When the shoe is adjusted to the position shown in dotted lines in Figure 1, free access is had to the space between the shoe and the mold channel 9 and in consequence thereof, the tire can be shifted to change its position with respect to the mold as will be understood.

When the gear is turned in the opposite direction, the pressing shoe is brought in firm contact with the casing so as to hold the same firmly against the walls of the channel 9 whereby it is eventually subjected to the action of vulcanizing heat. In the full line position shown in Figure 1, the dog 17 acts to retain this firm pressing engagement of said shoe with the casing.

While I have described the use of the device in connection with the casings of automobiles, it is equally useful in the vulcanizing of inner tubes, etc.

While I have herein fully shown and described and have pointed out in the appended claims certain novel features of construction, arrangement and operation which characterize my invention, it will be understood by those skilled in the art that various omissions, substitutions, and changes in the forms, proportions, sizes, of the materials used, and of their operation, may be made without departing from the spirit of my invention.

What is claimed as new is:—

1. A vulcanizer comprising an oven structure having a vulcanizing surface, a clamp co-acting with said surface, means for respectively moving the clamp in two positions, and means for holding the clamp in its position of adjustment, the moving means embodying a gear, and a rack bar carried by the clamp and co-acting with the gear.

2. A vulcanizer comprising an oven structure having a vulcanizing surface, a clamp co-acting with said surface, means for respectively moving the clamp in two positions, and means for holding the clamp in its position of adjustment, the moving means embodying a gear, and a rack bar carried by the clamp and co-acting with the gear, the holding means comprising an adjustable dog co-acting with said gear.

In testimony whereof I have affixed my signature.

JAMES EDWARD HENRY